Jan. 15, 1952     H. D. WOODSIDE     2,582,574
END THRUST TYPE ROTARY CUTTER HEAD
Filed Nov. 29, 1948
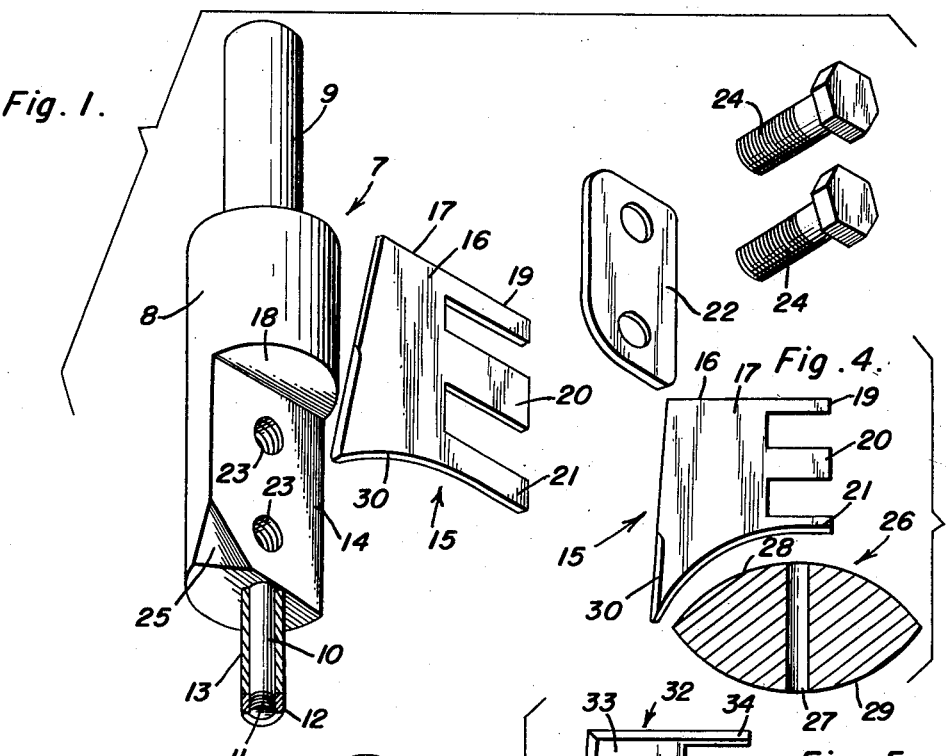
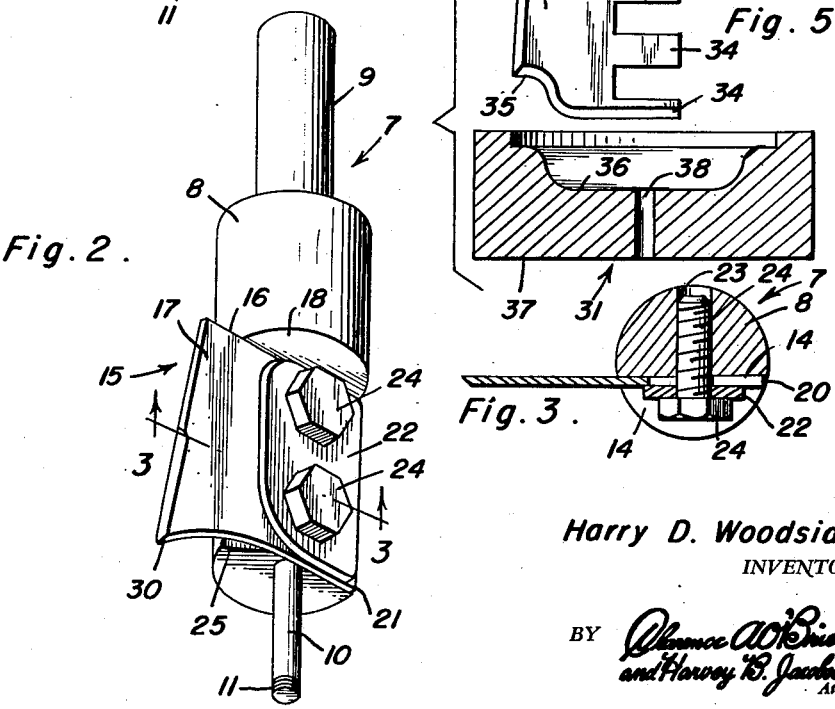
Harry D. Woodside
INVENTOR.

Patented Jan. 15, 1952

2,582,574

UNITED STATES PATENT OFFICE 2,582,574

END THRUST TYPE ROTARY CUTTERHEAD

Harry D. Woodside, Lincoln Park, Mich.

Application November 29, 1948, Serial No. 62,587

2 Claims. (Cl. 144—219)

This invention relates to a rotary cutting and shape forming tool for contouring and imparting predetermined surface shapes to circular workpieces of wood, plastics or equivalent soft materials.

In carrying out my inventive ideas and reducing to practice a preferred embodiment of the tool, I provide one which is susceptible of satisfactory use when clamped in the chuck of a drill press or electric hand drill or the like and so construct the cutter head that it may be successfully used to accommodate and operate any number of interchangeable cutting blades, the cutting edges of the blades varying to assume predetermined proportions and shape for successful cutting and forming of corresponding shapes on a wooden or equivalent work-piece.

Another object of the invention is to provide a tool of the type herein shown and described which is practical and adaptable for both concave and convex usages thus providing an adaptation for cutting and shaping circular wheels for producing model airplane cowlings, for counterboring and producing various styles of die models, hammer forms and so on.

Another object of the invention is to structurally, functionally and otherwise improve upon known types of tools possessed of similar structural characteristics, a preferred embodiment of said tool being characterized by an especially designed cutter head having a shank at one end to be fastened in the chuck of a drill, having a mount to sustain in place readily applicable and removable cutting and forming blades and having, in addition, a stem projecting from one end of the head and constituting a pilot to enter a centering bore provided therefor in the work-piece which is to be shaped.

Other objects, features and advantages will become more readily apparent from the following description and the accompanying illustrative drawings.

In the drawings, wherein like numerals are employed to designate like parts throughout the views:

Figure 1 is a perspective view of a so-called exploded type showing the assemblage of all elements which coordinate in providing a cutting, shaping and forming tool constructed in accordance with the principles of my invention.

Figure 2 is a perspective view with the parts assembled and ready for operation.

Figure 3 is a cross section on the line 3—3 of Figure 2, looking in the direction of the arrows.

Figure 4 is a view in section and elevation showing a work-piece, a wheel, and the type of cutting blade used for shaping same.

Figure 5 is a view, like Figure 4, in elevation, and section showing a die model and manner in which same is recessed with the illustrated cutting blade.

Referring now to the drawings by distinguishing reference numerals, the tool proper is denoted by the numeral 7 and is characterized by a one piece solid metal body, the major portion of which constitutes a cutter head 8 which is, in the main, cylindrical in cross section. Projecting axially from one end of the cutter head is a stout, but reduced, cylindrical shank 9 which in practice is adapted to be chucked in the chuck of a drill press or hand or electric drill. Also in axial alignment with the shank and head is a relatively small projecting stem 10, also cylindrical, which constitutes a pilot element. This is of a prescribed cross sectional dimension or diameter and has a screw threaded end 11 to accommodate a suitably knurled clamping collar or nut 12 for holding in place a sleeve or bushing 13. It may be explained at this stage that I contemplate providing a suitable number of interchangeable bushings each having an internal bore to fit the external diameter of the pilot stem and each varying in external diameter depending on the size of the bore in the workpiece which is being acted on. Referring again to the cutter head, it will be observed that one side is notched away to provide a bed mount 14 for the different cutting tools used. In Figures 1, 2 and 3, a specific type of tool is shown and is conveniently denoted by the numeral 15. The tool comprises a substantially rectangular blank 16 with a straight edge 17 which abuts the shoulder 18, the right hand end portion of the blank being notched to provide a plurality of rectilinearly straight clamping fingers 19, 20 and 21 which are clamped firmly by a cleat or plate 22 on the mount 14. The mount is provided with screw threaded sockets or holes 23 for the clamping and assembling bolt 24. One corner portion at one end of the tool head is chamfered as at 25 to provide clearance for cuttings when the tool is in rotary operation. In Figure 1 we see all of the parts individually and in readiness for assemblage. In Figures 2 and 3, the tool is completely assembled and ready for use.

Reference being had at this stage to Figure 4, the work-piece is denoted by the numeral 26 and has a central bore 27 for the pilot and assuming that the work on this piece has been finished, the top and bottom sides are convexed as at 28 and 29 respectively.

Assuming that the operator wants to make one or more wheels 26 as shown in Figure 4, he selects a piece of material approximately three-quarters of an inch thick and drills the central hole for each wheel desired and of whatever diameter he wishes to accommodate the axle (not shown). The boring of the hole is done on top of a piece of waste stock (not shown) or in alignment with a center hole in a drill press table (not shown). If the hole in the wheel hub is to be five-thirty seconds of an inch, the operator uses the pilot 10 on the tool without any bushing. On the other hand, if the hole is larger, it is necessary to slip the bushing in place and to fasten it on with the nut or collar 12 as illustrated.

Next, the operator fastens the shank 9 of the tool in a drill press and enters the pilot 10 in the hole 27 of the work-piece 26 and depresses the tool until the entire cutting surface of the blade, the surface 30, has cut away approximately one-half of the work-piece. Then, the work-piece is removed and turned over and the operation is repeated to shape and form the other side, thus providing the two surfaces 28 and 29, as is obvious. The portion, if any, of the pilot which goes through the hole in the wheel is received in waste stock or hole in the drill press table as previously mentioned.

Where a die mold or similar product is to be produced as denoted at 31 in Figure 5, a different type of tool 32 is employed. The main or plate portion 33 is made to fit the foundation or bed surface 14 and the fingers or prongs 34 are clamped on with a cleat and bolt as shown. The cutting surface or edge 35 is so fashioned in advance as to produce a depression or recess 36 in the top of the work 37. Here, after the operation is completed, the bore 38 is suitably filled with a plug (not shown).

The operations referred to are fast and simple. The work-piece does not have to be clamped because the pilot retains the wheel after it is sheared from the work-piece. When making a depression or counterbore in any work-piece, the hole is drilled for the pilot and is subsequently plugged after the work is finished as stated.

The tool shown and described may be successfully and effectively used in any drill press or electric hand drill for efficient cutting, shaping and forming of any definite shape that is round and symmetrical on a wooden, plastic or equivalent work-piece up to any diameter safe for this tool, say approximately up to eight inches.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A rotary cutting and forming tool adapted to be used with a drill press, electric hand or similar drill comprising a one-piece body formed intermediate its ends into a substantially cylindrical elongated cutter head, formed at one end to provide a cylindrical driving shank, and formed at its opposite end into a pilot stem, the outer end of said pilot stem being screw threaded, a bushing fitting removably on said stem and bearing at its inner end against the adjacent end of the head, said bushing being of a length less than the length of the stem, and a clamping and assembling nut on the screw threaded end of said stem and engaging said bushing to hold the latter removably in place.

2. A rotary cutting and forming tool adapted to be used with a drill press, electric hand or similar drill and comprising a one-piece body formed intermediate its ends into a substantially cylindrical elongated cutter head, formed at one end into and defining a cylindrical driving shank, and formed at its opposite end into a pilot stem, the outer end of said pilot stem being screw-threaded, a bushing fitted removably on said stem and bearing at its inner end against the adjacent end of the head, said bushing being of a length less than the length of the stem, a clamping and assembling nut on the screw threaded end of said stem engaging said bushing to hold the latter removably in place, said head being of appreciable diameter and comparatively stout and sturdy, said shank being axially aligned with the head and of reduced diameter and said pilot stem being appreciably smaller in diameter than said shank, said head, at the end adjacent said pilot stem, being notched to provide a flat faced blade mount having a shoulder at right angles to said mount for placement and maintenance of a cutting and forming blade, a blade assembling and holding cleat parallel to said mount having bolt holes, said blade mount being provided with screw-threaded sockets, and bolts passing through said bolt holes and threaded into said sockets to hold said cleat in place and to render same ready for application and retention of a multiple pronged cutter blade.

HARRY D. WOODSIDE.

REFERENCES CITED

The following references are of record in the file of this patent:

UNITED STATES PATENTS

| Number | Name | Date |
| --- | --- | --- |
| 82,956 | Ives | Oct. 13, 1868 |
| 149,637 | Buchter | Apr. 14, 1874 |
| 161,447 | Schwamb | Mar. 30, 1875 |
| 215,005 | King | May 6, 1879 |
| 296,242 | Steers | Apr. 1, 1884 |
| 623,031 | Oldham | Apr. 11, 1899 |
| 843,430 | Bail | Feb. 5, 1907 |
| 1,164,659 | Moore | Dec. 21, 1915 |
| 1,201,696 | Cederholm | Oct. 17, 1916 |
| 1,425,300 | Wall | Aug. 8, 1922 |
| 1,480,762 | Howarth | Jan. 15, 1924 |
| 2,378,550 | Harris | June 19, 1945 |